United States Patent [19]

Seto

[11] Patent Number: 5,214,468
[45] Date of Patent: May 25, 1993

[54] METHOD OF CONTROLLING OUTPUT CONDITION OF ABNORMALITY SIGNAL IN PHOTOGRAPHIC FILM CARRIER AND APPARATUS THEREOF, AND PHOTOGRAPHIC FILM CARRIER

[75] Inventor: Yasuhiro Seto, Kanagawa, Japan

[73] Assignee: Fuji Photo Film Co., Ltd., Kanagawa, Japan

[21] Appl. No.: 888,981

[22] Filed: May 27, 1992

[30] Foreign Application Priority Data

May 28, 1991 [JP] Japan .................. 3-123856

[51] Int. Cl.⁵ .......................................... G03B 27/52
[52] U.S. Cl. ........................................ 355/41; 355/77
[58] Field of Search ................ 355/41, 50, 205, 206, 355/202, 77

[56] References Cited

U.S. PATENT DOCUMENTS

| | | | |
|---|---|---|---|
| 3,699,832 | 10/1972 | Smith et al. | 83/210 |
| 4,806,965 | 2/1989 | Yamanouchi et al. | 355/41 X |
| 5,122,645 | 6/1992 | Sakeki et al. | 355/41 X |
| 5,164,574 | 11/1992 | Ujiie et al. | 355/41 X |

FOREIGN PATENT DOCUMENTS

| | | |
|---|---|---|
| 52-2429 | 1/1977 | Japan . |
| 53-134422 | 11/1978 | Japan . |
| 54-103032 | 8/1979 | Japan . |
| 58-53537 | 12/1983 | Japan . |
| 1-130129 | 9/1989 | Japan . |
| 3-11329 | 1/1991 | Japan . |

OTHER PUBLICATIONS (English Abstract for 3-11329) Patent Abstracts of Japan (translated), Kokai No. 3-11329, published Jan. 18, 1991.
(English Abstract for 52-2429) Patent Abstracts of Japan (translated), Kokai No. 3-11329, published Jan. 10, 1977.
(English Abstract for 54-103032) Patent Abstracts of Japan (translated), Kokai No. 54-103032, published Aug. 14, 1979.
(English Abstract for 53-134422) Patent Abstracts of Japan (translated), Kokai No. 53-134422, published Nov. 24, 1978.

Primary Examiner—Richard A. Wintercorn
Attorney, Agent, or Firm—Sughrue, Mion, Zinn, Macpeak & Seas

[57] ABSTRACT

A photographic film carrier is provided for a printer-processor which is switchable in three operation modes, i.e., in a fully automatic mode, an automatic mode, and a manual mode. The photographic film carrier carries a photographic film on which an image frame is consecutively recorded, and positions each image frame at a printing position in order. The photographic film carrier is provided with a control unit to detect an abnormality that the image frame can not be accurately positioned. The control unit determines in response to the cause of the abnormality detected according to a current operation mode of the printer-processor whether or not an abnormality signal should be output. The control unit outputs the abnormality signal when it is determined in response to the detected abnormality that the abnormality signal should be output. Therefore, it is possible to effect an efficient operation according to each operation mode since the abnormality signal can be appropriately output according to each operation mode of the printer-processor.

19 Claims, 14 Drawing Sheets

METHOD OF CONTROLLING OUTPUT CONDITION OF ABNORMALITY SIGNAL IN PHOTOGRAPHIC FILM CARRIER AND APPARATUS THEREOF, AND PHOTOGRAPHIC FILM CARRIER

BACKGROUND OF THE INVENTION

1. Field of the Invention

The present invention relates to a photographic film carrier carrying a photographic film on which image frames are consecutively recorded, and positioning the respective image frames at a print position in order, more particularly to a method of controlling an output condition of an abnormality signal in the photographic film carrier for controlling the output condition of the abnormality signal output when detecting abnormality, and an apparatus thereof.

2. Description of the Related Art

A photoprinter is provided with a negative carrier at a print position for, in order, positioning image frames of a negative film at the print position after development of the film. The negative carrier comprises a base and a cover body which can open and close with respect to the base. The base has a negative film guide path provided with a printing opening corresponding to an image frame. The guide path has driving rollers at positions corresponding to the vicinities of both the lateral edges of the negative film. The driving rollers are rotated by a driving force of a pulse motor. The cover body is provided with idle rollers paired with the driving rollers to hold the negative film between the rollers and idle rollers. Thus, these driving rollers allow to hold and carry the negative film along the guide path when the cover body is closed and the negative film is inserted into the negative carrier from one side thereof.

A detecting apparatus for detecting an image frame edge is mounted upstream the printing opening of the guide path. The detecting apparatus, as disclosed in Japanese Patent Application Laid-Open No. 3-11329, is provided with a cold-cathode tube or a halogen lamp at the rear side of the guide path, and a slit hole formed in the guide path. In the detecting apparatus, each image frame of the negative film on the guide path is irradiated with a light emitted from the cold-cathode tube or halogen lamp.

The cover body is provided with a light receiving sensor corresponding to the slit hole so that light transmitted through the negative film can be received by the sensor. Transmission density of the negative film can be calculated based on quantity of received light detected by the light receiving sensor. Generally, a base portion of the negative film has a low transmission density while the negative film has a high transmission density within the range of the image frame. It is possible to compare a difference between the transmission density of the base portion and that of the image frame with the predetermined transmission density to detect a boundary between the image frame and the base portion, i.e., the image frame edge. The image frame edge allows to position the respective image frames of the negative film at the print position.

Therefore, it is possible to position each image frame of the negative film at the print position automatically and accurately even if the pitches of the respective image frames recorded on the negative film are fluctuated depending on feeding errors in photographing by a camera. Thus, the feeding error due to a quantitative feeding can be eliminated. In addition, the negative carrier itself can be simply constructed because it is not necessary to detect a notch provided for each image frame.

In such a control for positioning, a front edge of each image frame generally serves as a reference edge when it is normally spaced from the preceding image frame. If abnormally spaced, it is detected whether or not the back edge of the image frame is normally spaced from the preceding image frame. If normally spaced, the back edge can be used as the reference edge. If neither front nor back edges are normally spaced, the negative film is quantitatively fed on the basis of a state where the preceding image frame is positioned.

However, in the conventional positioning method as set forth above, unstable detection may be made depending on the image frames recorded on the negative film. That is to say, in some cases, adjacent image frames may be overlapped with each other, it may be difficult to distinguish the image frame from the base portion due to overexpose, and the edge portion may be unclear due to overexposure. In these cases, the detected edge is incorrect per se so that accurate positioning may not be made even if it is tried on the basis of the preceding image frame.

In case of detecting such an abnormality, the negative carrier is adapted to output an abnormality signal. The abnormality signal is fed into a controller of the photoprinter so that the controller controls the photoprinter to interrupt a process and to alert an operator to the abnormality by an alarm and so on. This system allows the operator to correct for a proper positioning compensation when accurate positioning can not be made in the automatic positioning control.

However, there may be a great diversity of abnormality causes such that the accurate positioning for the image frame is not made. Therefore, if an alarm is raised and the process is interrupted in response to every abnormality, operation efficiency will be deteriorated rather than improved. Namely, since the operator monitors the photoprinter in the vicinity thereof, for example, in case of operating in a manual mode, the abnormality can be eliminated without interruption of process in some cases. However, if the processing is interrupted for each detected abnormality, the subsequent action for eliminating the abnormality results in the reduced operation efficiency. On the other hand, in case of a fully automatic mode, it is possible to continue the process apart from the finished conditions of the respective prints except for such a case that the stop reference of the image frame can not be analogized. Further, it is a principal object of the operation in the fully automatic mode to process consecutively on condition that reprint process can be performed later. Accordingly, it is undesirable to interrupt the process to give the alarm in response to each abnormality except that the stop reference of the image frame can not be analogized.

SUMMARY OF THE INVENTION

In view of the facts set forth above, it is an object of the present invention to provide a method of controlling an output condition of an abnormality signal in a photographic film carrier, an apparatus thereof, and the photographic film carrier which can properly output a proper alarm according to each operation mode of a photoprinter, and can perform a printing process at a high efficiency.

A first aspect of the present invention provides a method of controlling an output condition of an abnormality signal in a photographic film carrier for controlling the output condition of the abnormality signal output when detecting an abnormality. The photographic film carrier carries a photographic film on which image frames are consecutively recorded and positions the respective image frames at a print position in order. The method comprises the steps of: (a) determining depending on the cause of the abnormality under a condition which is set in advance whether or not the abnormality signal should be output, in case that the abnormality such that the image frame can not be accurately positioned is detected; and (b) outputting the abnormality signal only when determining to output the abnormality signal in the Step (a).

According to the first aspect as constructed above, there are various abnormality causes, such as, underexposure, overexposure, fog of the negative film frame, unexposed negative film, or negative film size abnormality. Some of these causes allow to perform the process consecutively apart from the condition of the finished prints, and others do not allow to perform the process. Therefore, when detecting the abnormality, it is determined depending upon the cause of the abnormality under the condition which is set in advance whether or not the abnormality signal should be output. The abnormality signal is output only when determined to output the abnormality signal. Accordingly, under the condition, it is determined to output the abnormality signal in response to some causes of abnormality, and not to output in response to others. For example, any output condition of the abnormality signal can be set to improve a printing process efficiency according to the process configuration of a photographic film. As a result, it is possible to output the abnormality signal only when required.

In the first aspect, the condition in the step (a) can be set according to the process configuration of the photographic film, for example, an operation mode of the photoprinter provided with the photographic film carrier. The operation mode includes a fully automatic mode, an automatic mode, and a manual mode. Output of the abnormality signal can be limited so as to process at maximum efficiency in each operation mode. For example, since it is not necessary to output the abnormality signal in the manual mode, the cause of the sufficient abnormality that the abnormality signal should be output is set to a minimum number. In the automatic mode, the abnormality signal is output for each abnormality cause to alert an operator to the abnormality rapidly. In the fully automatic mode, according to a principal purpose of the fully automatic mode, the processes are consecutively performed irrespective of finished print condition unless a reference for positioning can not be analogized.

As described above, if the abnormality cause which the abnormality signal should be output can be determined according to the set operation mode, the process can be performed without a reduced operation efficiency in each operation mode.

A second aspect of the present invention provides an apparatus for controlling an output condition of an abnormality signal in a photographic film carrier for controlling the output condition of the abnormality signal output when detecting an abnormality. The photographic film carrier carriers a photographic film on which image frames are consecutively recorded, and positions each image frame at a print position in order. The apparatus comprises: a detecting means for detecting the abnormality that the image frame can not be accurately positioned; a determining means for determining depending upon the cause of the detected abnormality under the condition which is set in advance whether or not the abnormality signal should be output; and an output means for outputting the abnormality signal when it is determined by the determining means that the abnormality signal should be output.

According to the second aspect, when the detecting means detects the abnormality that the image frame can not be accurately positioned, the determining means determines depending upon the cause of the detected abnormality under the condition which is set in advance whether or not the abnormality signal should be output. The output means outputs the abnormality signal only when the determining means determines to output. Accordingly, depending on the predetermined condition, it is determined to output the abnormality signal in response to some causes of the abnormality, and not to output in response to others. For example, any output condition of the abnormality signal can be set to improve the printing process efficiency according to the process configuration of the photographic film. As a result, it is possible to output the abnormality signal only when required.

In the second aspect, the condition can be set corresponding to one of a plurality of operation modes of the photoprinter equipped with the photographic film carrier. The determining means determines according to the operation mode which is currently set in the photoprinter whether or not the abnormality signal should be output. Therefore, it is possible to output the abnormality signal at maximum operation efficiency for each operation mode of the photoprinter. A plurality of the operation mode includes a fully automatic mode, an automatic mode, and a manual mode.

A third aspect of the present invention provides a photographic film carrier for carrying a photographic film on which image frames are consecutively recorded, and positioning the respective image frames at a print position in order. The photographic film carrier comprises a base having a guide path for guiding the photographic film, the guide path formed with a pass opening for exposing light at the printing position; an image frame detecting means disposed upstream the printing position of the guide path, and detecting the image frame based on a transmission density of the photographic film; a positioning means for positioning the image frame detected by the image frame detecting means at the printing position; an abnormality detecting means for detecting the abnormality that the image frame can not be accurately positioned by the positioning means; a determining means for determining depending upon the cause of the detected abnormality under the condition which is set in advance whether or not an abnormality signal should be output; and an output means for outputting the abnormality signal when it is determined by the determining means that the abnormality signal should be output.

According to the third aspect, the image frame of the photographic film carried on the guide path provided on the base, is detected upstream the printing position by the detecting means. The detected image frame is positioned by the positioning means. In this case, the printing process can be consecutively performed for each image frame unless the image frame can not be detected by the image frame detecting means due to, for example, a whole unexposed film or a foggy film. When an operator monitors the printing process, it is not necessary to output the abnormality signal even if abnormality occurs. Thus, it can improve an operation efficiency to output the abnormality signal in response to some causes of the abnormality, while it should reduce the operation efficiency to output the abnormality signal in response to others. Therefore, the determining means determines depending upon the cause of the abnormality detected by the abnormality detecting means under the condition which is set in advance whether or not the abnormality signal should be output. Consequently, the output means outputs the abnormality signal only when the determining means determines to output.

As a result, it is possible to output the abnormality signal at appropriate time without reduced operation efficiency.

In the third aspect, the condition can be set corresponding to one of a plurality of operation modes of the photoprinter provided with the photographic film carrier. The determining means determines according to the operation mode which is currently set in the photoprinter whether or not the abnormality signal should be output. Therefore, it is possible to output the abnormality signal at maximum operation efficiency for each operation mode of the photoprinter. A plurality of the operation mode includes a fully automatic mode, an automatic mode, and a manual mode.

In the photoprinter, these operation modes are switchable. The manual mode allows the operator to manually perform almost the operations. The automatic mode only allows the operator to perform the printing operation after completion of positioning. The fully automatic mode automatically performs all the operations. In the respective modes, for example, since it is not necessary to output the abnormality signal in the manual mode, the cause of the abnormality that the abnormality signal should be output can be set to a minimum number. In the automatic mode, the abnormality signal is output for each abnormality cause to alert the operator to the abnormality rapidly. In the fully automatic mode, according to a principal purpose of the fully automatic mode, the processes are consecutively performed irrespective of the finished conditions of the prints unless a reference for positioning can not be analogized.

As discussed above, the condition is set to correspond to each operation mode. Further, it is determined in response to the detected abnormality according to the set condition whether or not the abnormality signal should be output. Therefore, it is possible to perform the operation without reduced operation efficiency of each operation mode.

If the image frame has an extreme defect such as underexposure, overexposure, fog, or unexposure, an image frame edge may not be detected. In this case, the negative film is carried by a predetermined interval from a stop position of the preceding image frame for positioning. The carrying control prohibits a rapid interruption of the process, and results in improvement of the operation efficiency, especially, in the fully automatic mode. Further, it may be employed to store the image frame number positioned by carrying by the predetermined interval, and to display the number during operator's check.

As described hereinbefore, in the photographic film carrier of the present invention, a method of controlling the output condition of the abnormality signal and an apparatus thereof have an excellent advantage that it is possible to select an abnormality cause to output the abnormality signal, and ensure the efficient operation according to each control mode of the photoprinter.

DESCRIPTION OF THE PREFERRED EMBODIMENTS

Figure 1:
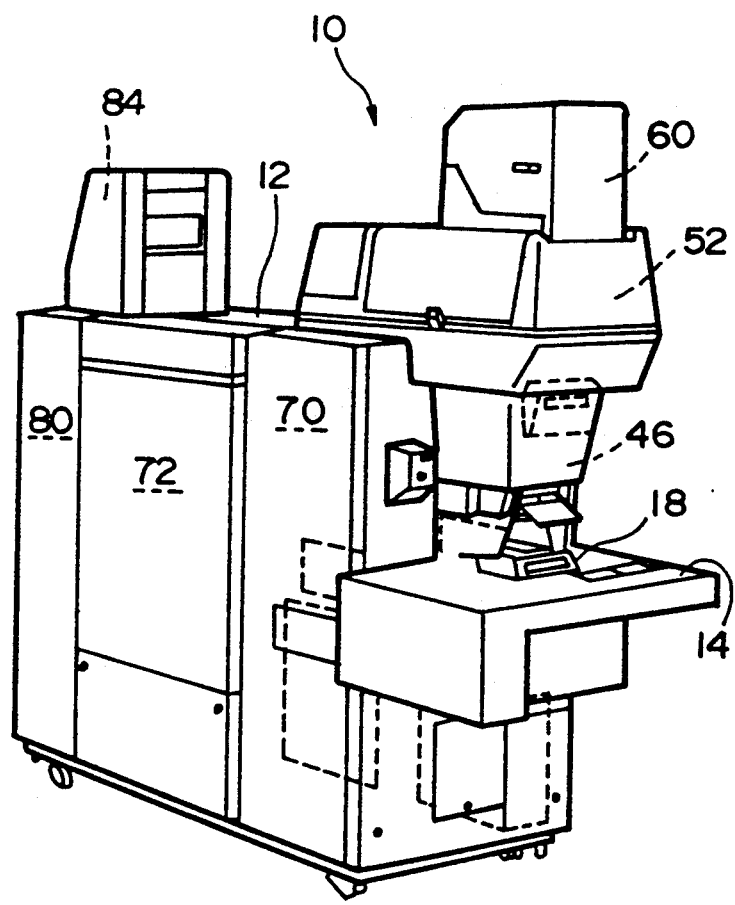
FIG. 1 is a perspective view illustrating an external construction of a printer-processor.
Figure 2:
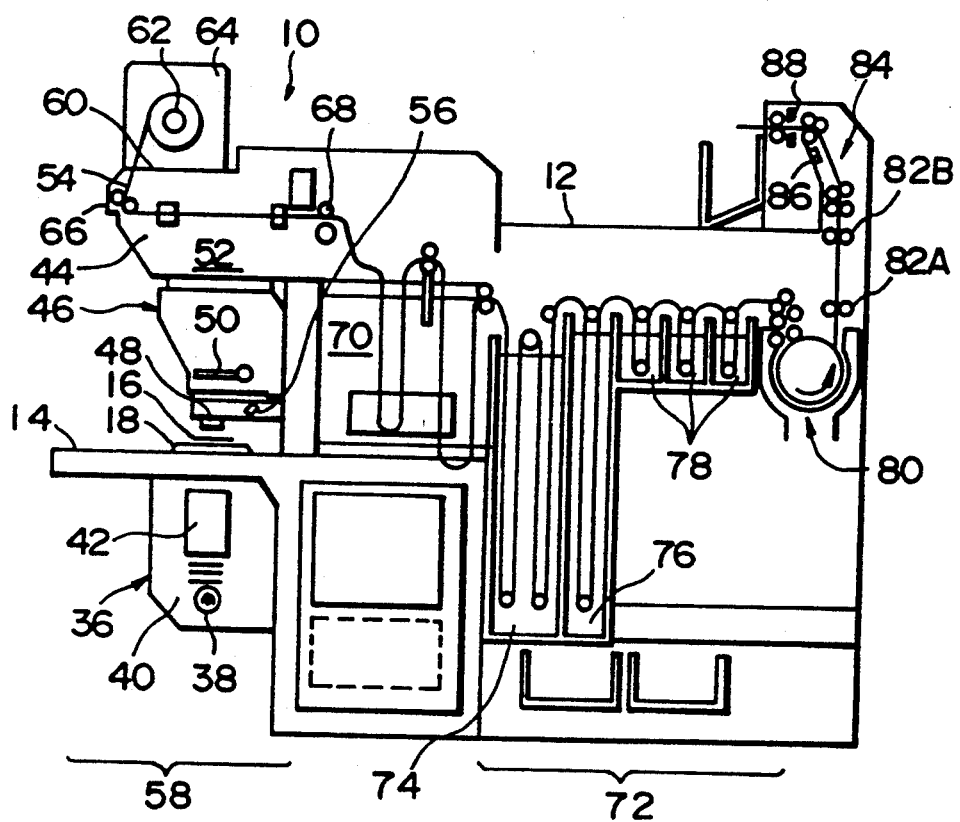
FIG. 2 is a schematic diagram illustrating an internal construction of the printer-processor.

FIGS. 1 and 2 illustrate a printer-processor 10 serving as a photoprinter, to which a method and a control unit, and a photographic film carrier according to the present invention are applied. Referring now to the accompanying drawings, overall construction of the printer-processor 10 will be described.

The printer-processor 10 is externally covered with a casing 12.

The printer-processor 10 is provided with a working table 14 projecting from the casing 12 to the left-hand in FIG. 2. A negative carrier 18 in which a negative film 16 is set is mounted on the upper surface of the working table 14. A detail construction of the negative carrier 18 will be discussed in the following.

A light source portion 36 is under the working table 14. The light source portion 36 has a light source 38. Light emitted from the light source 38 passes through a filter portion 40 and diffusion cylinder 42, and reaches the negative film 16 set on the negative carrier 18. The filter portion 40 comprises three filters C, M, and Y. Each filter is adapted to move into or out of an optical axis of the light.

An optical system 46 is mounted on an arm 44 projecting from the printer-processor 10. The optical system 46 comprises a lens 48 and a shutter 50, and is disposed across the optical axis of the light. The light transmitted through the negative film 16 passes through the lens 48 and the shutter 50 to direct an image of the negative film 16 on a photographic paper 54 set in an exposure chamber 52.

Further, the optical system 46 is provided with a densitometer 56 such as CCD for measuring a density of the negative film 16. The densitometer 56 is connected to a controller 162 (see FIG. 3). An exposure compensation during exposure is set according to data measured by the densitometer 56 and keyed data by an operator.

An exposure portion 58 comprises the light source portion 36, the optical system 46, and the exposure chamber 52, to perform a printing process.

A mounting portion 60 is provided on the upper side of the arm 44. Mounted detachably on the mounting portion 60 is a paper magazine 64 containing a photographic paper 54 wound around a reel 62 in a layer fashion.

A pair of rollers 66 are disposed in the vicinity of the mounting portion 60 to hold the photographic paper 54 therebetween to carry to the exposure chamber 52. Also, a pair of rollers 68 are disposed in the vicinity of the exposure chamber 52. Similarly, the rollers 68 hold the photographic paper 54 on which an image of the negative film 16 is recorded, in the exposure chamber 52 to carry to a reservoir portion 70 adjacent to the exposure chamber 52.

The reservoir portion 70 has the printed, or exposed, photographic paper 54 in store to cancel difference in operating time between the exposure portion 58 and a processor portion 72. The exposure portion 58 performs a printing process while a processor portion 72 performs a developing, a fixation, and a washing in water.

The photographic paper 54 ejected from the reservoir portion 70 is carried to a color development portion 74 of the processor portion 72 adjacent to the reservoir portion 70. The photographic paper 54 is immersed in developer for development in the color development portion 74. The developed photographic paper 54 is carried to a bleach-fix portion 76 adjacent to the color development portion 74. The photographic paper 54 is immersed in fixer for fixation in the bleach-fix portion 76. The fixed photographic paper 54 is carried to a rinse portion 78 adjacent to the bleach-fix portion 76. The photographic paper 54 is immersed in washing water in the rinse portion 78 for washing in water.

The washed photographic paper 54 is carried to a drying portion 80 adjacent to the rinse portion 78. The drying portion 80 winds the photographic paper 54 around a roller to expose to hot-air for drying.

A pair of rollers 82A hold the photographic paper 54 therebetween, and ejects the dried photographic paper 54 from the drying portion 80 at regular velocity. A pair of rollers 82B are disposed on the upper side of the rollers 82A. The rollers 82B intermittently rotates corresponding to operation of a cutter portion 84 which is disposed downstream the drying portion 80. The cutter portion 84 comprises a cut mark sensor 86 for detecting a cut mark provided for the photographic paper 54, and a cutter 88 for cutting the photographic paper 54. The cutter portion 84 cuts the photographic paper 54 at every image frame, and ejects the image frames outside the casing 12 of the printer-processor 10.

Figure 3:
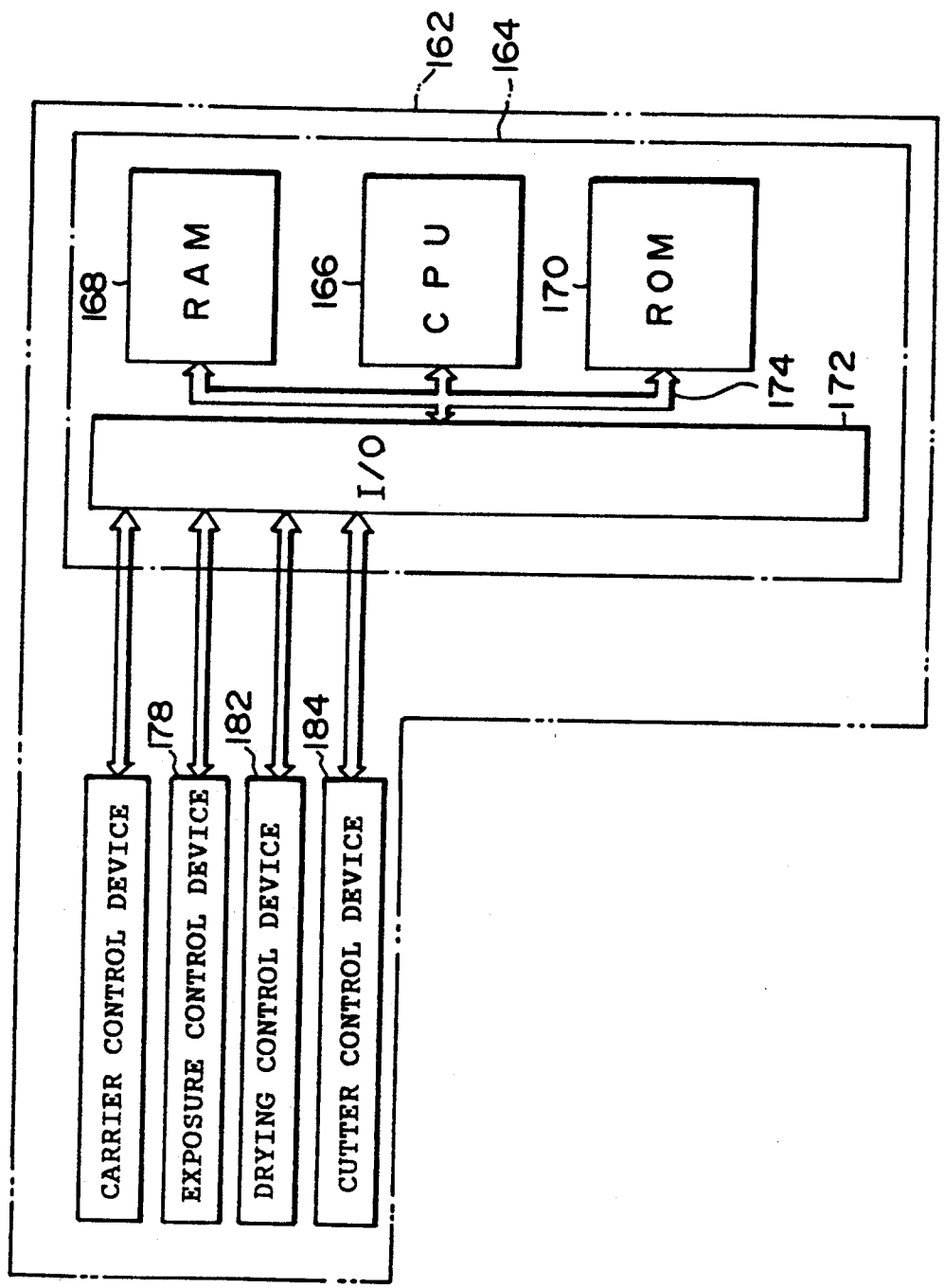
FIG. 3 is a block diagram of a controller of the printer-processor.

As shown in FIG. 3, each control in the devices described later is performed by the controller 162. The controller 162 includes a microcomputer 164. The microcomputer 164 comprises CPU 166, RAM 168, ROM 170, an input-output port 172, and a bus 174 such as a data bus or a control bus. The CPU 166, the RAM 168, the ROM 170 and the input-output port 172 are connected by the bus 174.

The controller 162 is connected with a carrier control device 176 which controls a carrying system for the negative film 16 and photographic paper 54 in the printer-processor 10. The controller 162 is connected with an exposure control device 178. The exposure control device 178 controls an exposure system which serves to, for example, turn on the light source 38, move the respective filters of the filter portion 40 in and out of the optical axis, feed a frame in the negative carrier 18, and open and close the shutter 50 in the exposure portion 58. The controller 162 is connected with a drying control device 182 which controls driving conditions for a fan and a heater in the drying portion 80. Further, the controller 162 is connected with a cutter control device 184 which controls to detect the cut mark by the cut mark sensor 86 of the cutter portion 84 downstream the drying portion 80, and cut the photographic paper 54 by the cutter 88.

Figure 4:
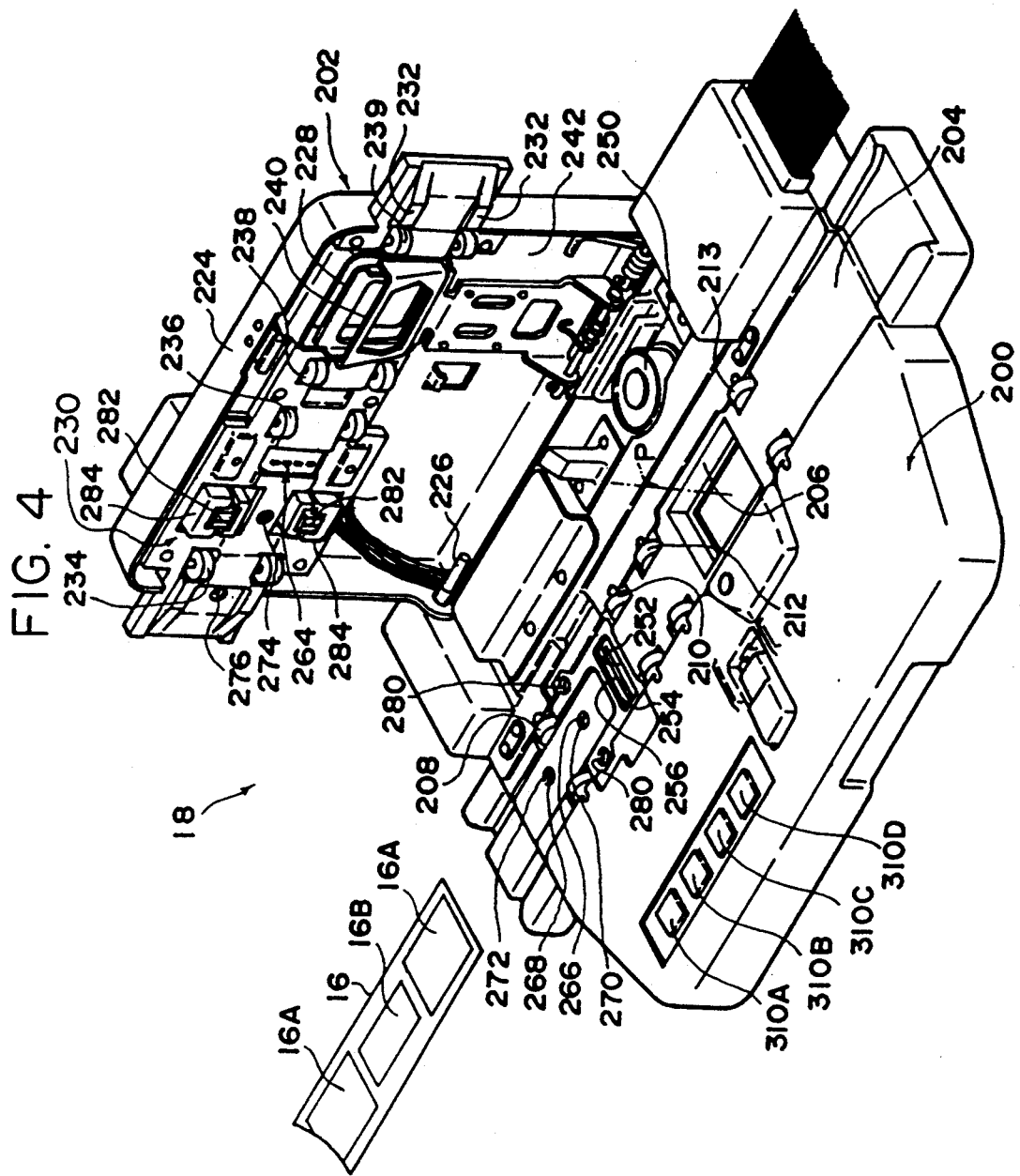
FIG. 4 is a perspective view illustrating an external construction of a negative carrier.

FIG. 4 illustrates a preferred embodiment of the negative carrier 18 according to the invention. The negative carrier 18 essentially comprises a pedestal 200 serving as a base, and an opening/closing cover 202 serving as a cover body.

The pedestal 200 has a negative film carrying path 204 serving as a guide path. The negative film carrying path 204 is provided with a printing opening 206 at a longitudinal intermediate portion thereof. The printing opening 206 serves as an exposure opening for light emitted from the light source 38 which is provided for the printer-processor 10.

Figure 5:
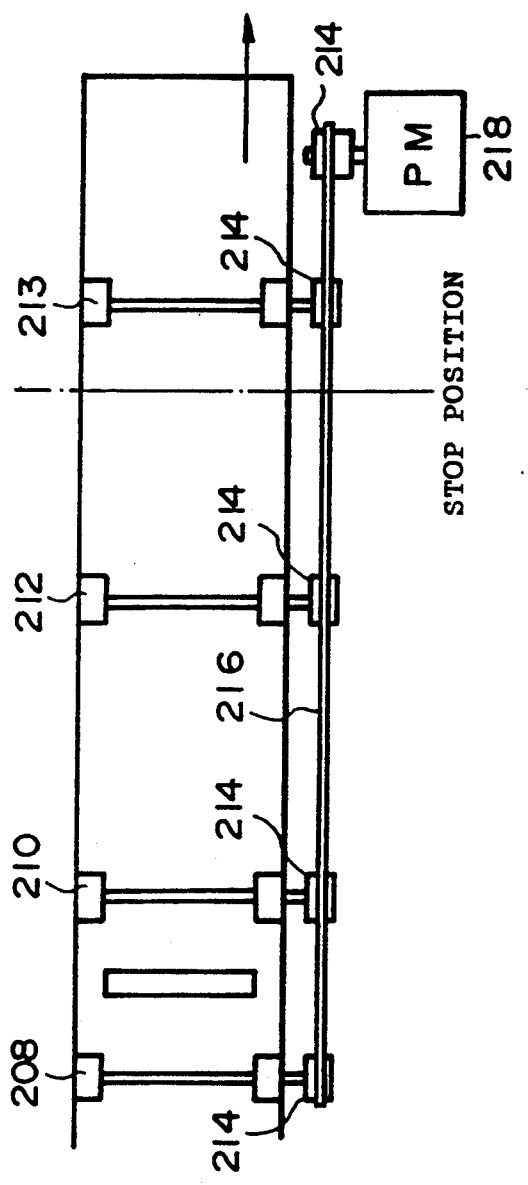
FIG. 5 is a perspective view illustrating a carrier system of the negative carrier.
Figure 6:
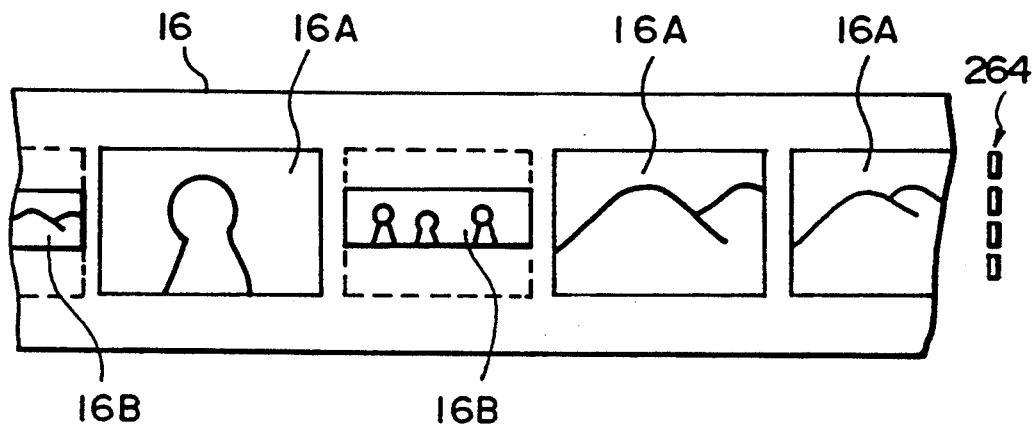
FIG. 6 is a plan view illustrating a size of each image frames recorded on a negative film.

The printing opening 206 has the same size as a full-size image frame 16A of the negative film 16 (see FIG. 6). In the negative film carrying path 204, carrying rollers 208, 210, 212, 213 are disposed between the upstream side of the printing opening 106 (on the left-hand side in FIG. 4) and the downstream side thereof (on the right-hand side in FIG. 4) corresponding to the back surface (underside) of the negative film 16. As shown in FIG. 5, the respective rollers 208, 210, 212, and 213 are provided with sprockets 214 at one of the axial ends of the respective roller axes. The respective rollers are engaged with a teeth portion formed on an endless timing belt 216.

The timing belt 216 is engaged with the sprocket 214 provided for the carrying roller 208 which is positioned at the most upstream side, and engaged with the sprocket 214 which is positioned at the most downstream side and provided for a rotation axis of a pulse motor 218. The pulse motor 218 is connected through a divider 222 to a control unit 220 (see FIG. 10), and is driven step-by-step in response to a driving signal from the control unit 220. Thus, when the pulse motor 218 rotates, the respective carrying rollers 208, 210, 212, and 213 are driven to rotate in the same rotating direction at the same rotating velocity.

In the opening/closing cover 202, one side edge of a case-like cover body 224 is pivotally supported by a bar 226 secured to the pedestal 200. The opening/closing cover 202 can be opened and closed pivotally on the bar 226 with respect to the pedestal 200.

A through-hole 228 corresponding to the printing opening 206 is provided in a bottom of the cover body 224. In addition, the cover body 224 is provided with an upper guide base 230 at a position corresponding to the negative film carrying path 204 in a closed condition.

Negative film guide walls 232 are integrally provided for the upper guide base 230 at the entrance side and the exit side of the negative film 16, respectively. The negative film guide wall 232 on the entrance side has a tapered upstream edge in the negative film carrying direction, and the negative film guide wall 232 on the exit side has a tapered downstream edge in the negative film carrying direction. The tapered edges are provided to form a slightly larger space than a thickness of the negative film 16 between the negative film guide wall 232 and the bottom surface of the negative film carrying path 204. The tapered edges ensure the carrying path for the respective lateral edge portions of the negative film.

Idle rollers 234, 236, 238, and 239 are disposed correspondingly to the carrying rollers 208, 210, 212, and 213 between the respective guide walls 232 of the upper guide base 230. When the opening/closing cover 202 is closed, the negative film 16 is hold between the idle rollers 234, 236, 238, and 239 and the carrying rollers 208, 210, 212, and 213, and can be carried.

Disposed on the upper guide base 230 is an upper mask 240 at the intermediate portion thereof in the negative film carrying direction. The upper mask 240 can relatively move with respect to the upper guide base 230, and has an opening at a position corresponding to the through-hole 228. The upper mask 240 is removably provided for a mask base 242. In this embodiment, two types of the upper masks 240 are used, one having a full-size opening, and the other having a panoramic opening. These upper masks 240 can be selectively exchanged according to the size of image frames (see FIG. 6) which is recorded on the negative film 16.

Figure 7:
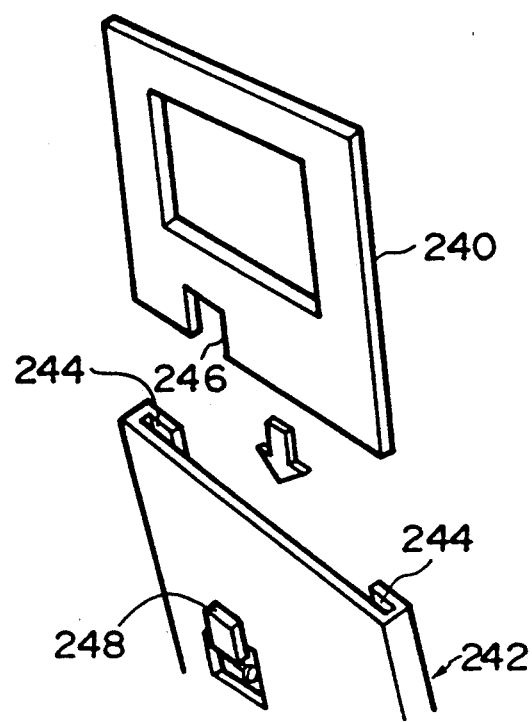
FIG. 7 is a perspective view of a mask base.

As shown in FIG. 7, a mask base 242 has the respective lateral edge portions which are opposed with each other and bent to form substantially channel section, thereby forming a rail portion 244. The upper mask 240 is inserted into the rail portion 244 so that the upper mask 240 is supported by the mask base 242. A type of the upper mask 240 (for example, with the full-size opening) has a notch 246 at the pointed edge on the entrance side of the upper mask 240. At a position corresponding to the notch 246, a limit switch 248 is mounted on the rail portion 244.

Figure 10:
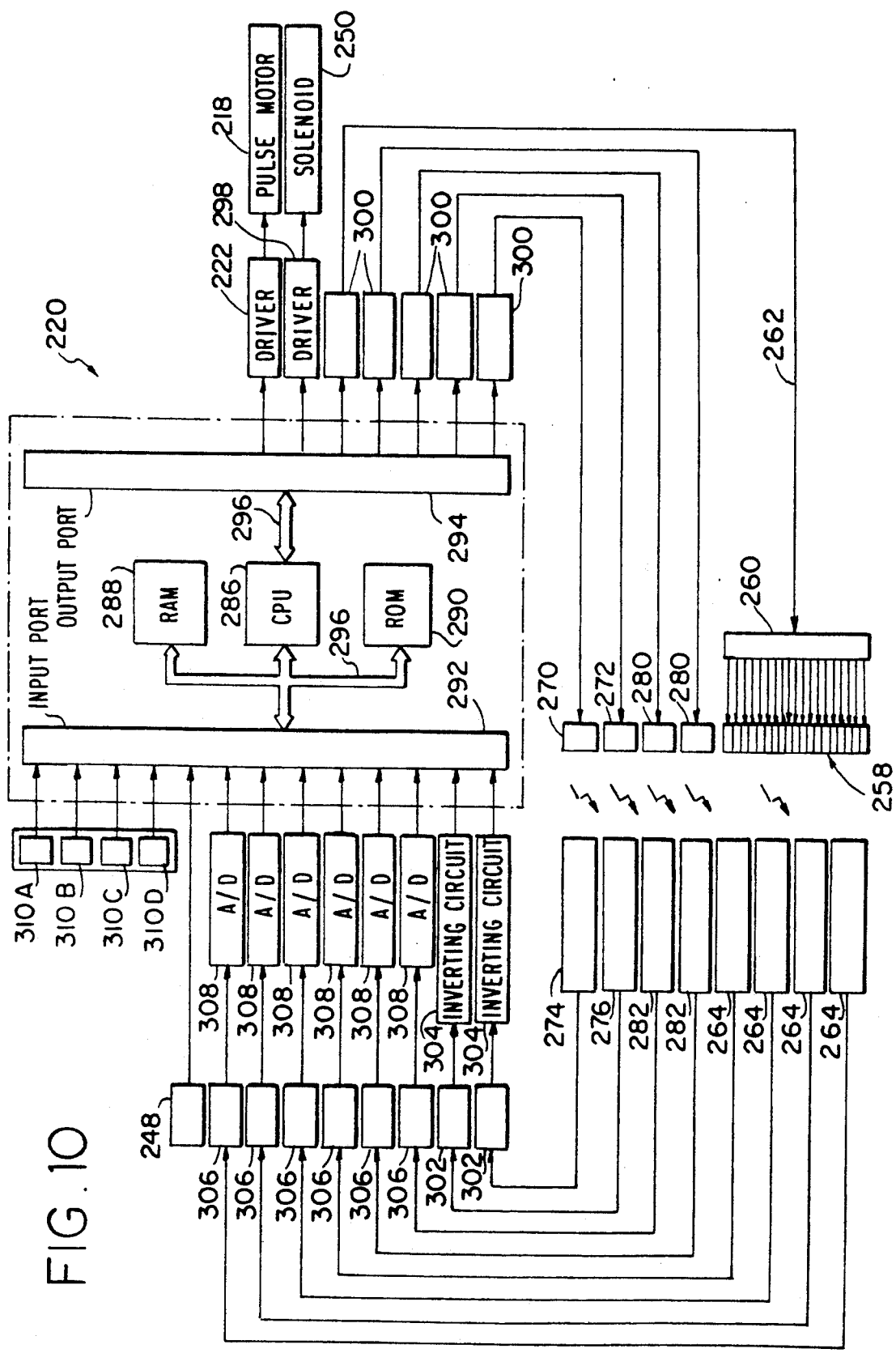
FIG. 10 is a block diagram of a control unit of the negative carrier.

A signal line extending from the limit switch 248 is connected to the control unit 220 (see FIG. 10). Consequently, only when the upper mask 240 with the panoramic size opening in inserted, a contact point to contact the limit switch 248 with the upper mask 240 is switched. Thus, it is possible to discriminate the type of the inserted upper mask depending on ON/OFF condition of the limit switch 248.

The mask base 242 is pivotally supported about a pivoting axis in the vicinity of the pivoting axis of the cover body 224 to correspond to a solenoid body 250 mounted on the pedestal 200 with the cover body 224 closed. When the solenoid body 250 is energized, the mask base 242 is attracted by magnet power to the solenoid 250. Accordingly, the upper mask 240 can be tightly contacted with the printing opening 206 of the negative film carrying path 204. Further, the negative film 16 is positioned with respect to the optical axis P, and can be held between the upper mask 240 and the printing opening 206.

Figure 8:
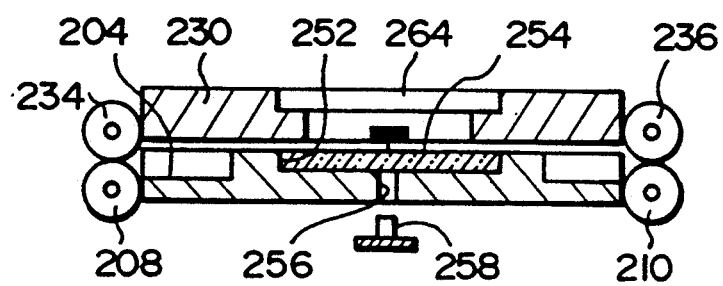
FIG. 8 is a side sectional view of a guide path for the negative carrier.

As shown in FIG. 8, a rectangular groove 252 is provided at a position upstream the printing opening 206 on the bottom surface of the negative film carrying path 204. The groove 252 has longitudinal sides which is identical with the lateral length of the negative film carrying path 204. A transparent glass plate 254 is fitted into the groove 252 to form a coplanar surface with respect to a peripheral guide surface. A slit hole 256 passing through the negative film carrying path 204 is provided in the bottom of the groove 252. The slit hole 256 has longitudinal sides identical with the lateral length of the negative film carrying path 204. The longitudinal sides of the slit hole 256 are disposed along the cross direction of the negative film carrying path 204. Corresponding to the slit hole 256, a plurality of LED chips serving as light emitting portions are disposed on the back surface of the negative film carrying path 204 in the cross direction of the negative film carrying path 204, i.e., along the cross direction of the negative film carrying path 204.

Figure 9:
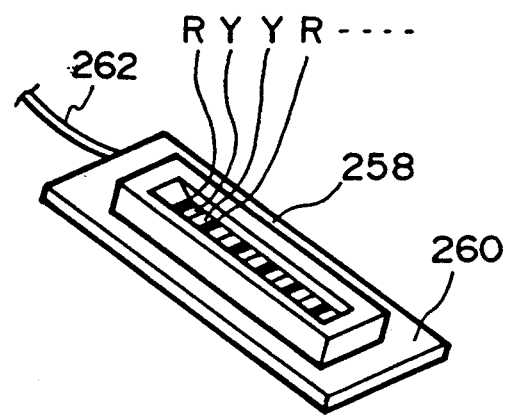
FIG. 9 is a perspective view of a LED chip.

As shown in FIG. 9, two-color LED chips 258 emitting R (red light) and Y (yellow light) are arranged on the substrate 260. These chips are arranged in the order of RYYRYYRYY . . . , starting with left-hand side in FIG. 9. Therefore, a ratio of R to Y is 1:2, and luminous efficiencies of the respective colors are identical with each other.

The respective LED chips 258 are connected through a shared signal line 262 to the control unit 220 (see FIG. 10). Lights are emitted from the chips 258 in response to a signal output from the control unit 220, and are transmitted through the negative film 16 carried along the negative film carrying path 204.

The slit hole 256 is opposed to four image detecting plane sensors 264 provided in the upper guide base 230 of the cover body 224 with the cover body 224 closed. Consequently, the image detecting sensors 264 detect transmission exposure of the light transmitted through the negative film 16. As shown in FIG. 6, the four image detecting sensors 264 are disposed along the cross direction of the negative film 16, and connected to the control unit 220 through each independent signal line. The control unit 220 obtains a distribution of the transmission density of the photographic film based on output signals from the image detecting sensors 264. Thus, the control unit 220 can detect a boundary between the image frame 16A and the base portion, i.e., an image frame edge.

As shown in FIG. 6, the image detecting sensors 264 are arranged within the range of longitudinal dimension of the full-size image frame 16A (in the cross direction of the negative film 16). Further, two of those on the intermediate side of the negative film 16 are arranged within the range of longitudinal dimension of the panoramic size image frame 16B having a panoramic image plane, while the rest of those are arranged outside the range of longitudinal dimension of the panoramic size image frame 16B. Accordingly, if two of the image detecting sensors 264 at the respective ends of the image detecting sensors 264 detect values having the base density of the negative film 16, it can be determined that the detected image frame is the panoramic size image frame 16B.

The bottom surface of the negative carrying path 204 is slightly deepened at the lateral intermediate portion thereof further upstream the slit hole 256. Consequently, the bottom surface never contacts with the negative film 16 during carrying the negative film 16. Namely, since the bottom surface contacts only with the respective lateral edge portions of the negative film 16, the image frame face of the negative film 16 can avoid damage. The deepened bottom surface is longitudinally provided with two circular holes 266, 268 in the lateral intermediate portion of the negative film carrying path 204. LED elements 270, 272 are buried in the circular holes 266, 268. The LED elements 270, 272 are connected to the control unit 220, respectively, and are adapted to emit in response to a signal from the control unit 220.

The LED element 270 nearer to the slit hole 256 serves to detect a splice tape or managing tape. The splice tape is applied to unite a plurality of the negative films 16 to form a roll. The managing tape is attached on the respective negative films 16. On the other hand, in the negative film carrying path 204, the LED element 272 provided on the entrance side of the negative film serves to detect presence or absence of the negative film 16. The LED elements 270, 272 are arranged correspondingly to a tape sensor 274 and the negative film presence or absence sensor 276 which are mounted on the upper guide base 230, respectively. The tape sensor 274 and the negative film presence or absence sensor 276 are connected to the control unit 220, respectively.

LED elements 280 are buried in the respective lateral ends of the negative film carrying path 204 between the LED elements 270 and 272. The LED elements 280 are connected to the control unit 220, and are provided corresponding to bar code sensors 282 which are mounted at the respective lateral ends of the upper guide base 230. The bar code sensors 282 are connected to the control unit 220. Bar codes provided for the negative film 16 are transmitted by the light emitted from the LED elements 280, and are detected by the bar code sensors 282. In such a way, the bar code can be decoded in the control unit 220.

Figure 11:
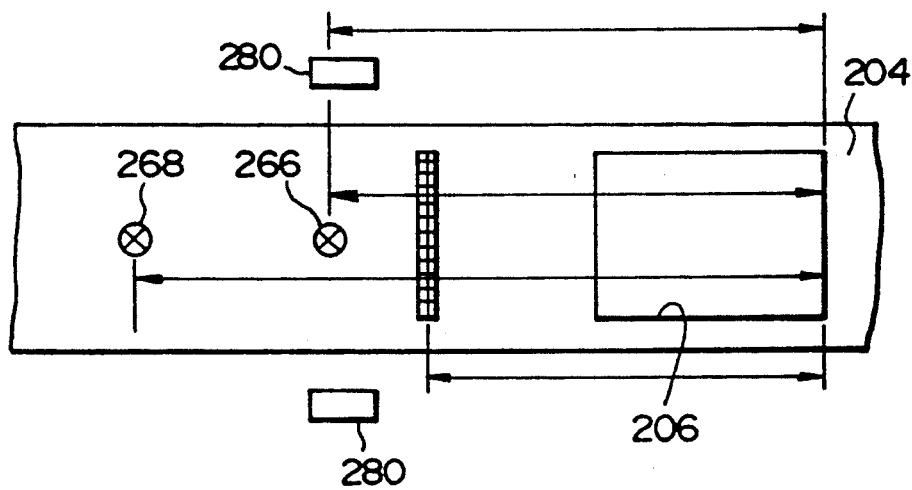
FIG. 11 is a plan view illustrating a position and relationship between a printing opening and sensor position.

The bar code sensors 282 are mounted on frame members 284 which are rockably provided with respect to the upper guide base 230. The bar code sensors 282 are adapted to track the negative film 16 which is meanderingly carried. Accordingly, for all the meandering negative film 16, the bar code sensors 282 can read the bar code provided for a narrow portion at the lateral end of the negative film 16. As shown in FIG. 11, the positions of the respective sensors are determined on the basis of a reference side (in the embodiment, a side furthermost from these respective sensors, i.e., a right-hand side in FIG. 11) of the printing opening 206.

As shown in FIG. 10, the control unit 220 comprises CPU 286, RAM 288, ROM 290, input port 292, output port 294, and bus 296. The input port 294 is connected through the driver 222 to a pulse motor 218, and through a diver 298 to the solenoid body 250, respectively.

On the other hand, the output port 294 is connected through LED driver 300 to the LED elements 270, 272, 280, and to the substrate 260 of the LED chip 258.

The input port 292 is connected to the tape sensors 274 and the negative film presence or absence sensors 276 through comparators 302 and inverted circuits 304. Further, the input port 292 is connected through amplifiers 306 and A/D converters 308 to two bar code sensors 282 and four image detecting sensors 264. Moreover, the input port 292 is connected to four key switches 310A, 310B, 310C, and 310D which are mounted on the pedestal 200 of the negative carrier 18. Operation of these key switches allows to feed forward, feed backward, and finely adjust the stop position of the negative film 16.

The control unit 220 is connected with the controller 162 in the side of the printer-processor 10. The control unit 220 communicates with the controller 162 in the following cases, i.e., where the image frame has been positioned, where the next image frame should be operated for positioning after completion of the printing process of the image frame, and where an abnormality occurs in the negative film carrying system or the image plane detection in the negative carrier 18. If such an abnormality occurs, an alarm (not shown) mounted on the printer-processor 10 is adapted to signal the abnormality, and to interrupt the process. However, the output of the abnormality signal can be limited according to each mode since the negative carrier 18 is controlled in each mode, i.e., a manual mode, an automatic mode, or a fully automatic mode.

In the manual mode, it is not necessary to alert the operator to the abnormality except for a few cases since the operator monitors the apparatus. In the fully automatic mode, it is undesirable for operation efficiency to signal every abnormality to interrupt the process. For example, when one image frame is overexposed, an optimal print of the image frame can not be expected in the fully automatic mode. However, reprinting of the image frame after a series of operations is more efficient in comparison with operating the printing process switched to the manual mode for each abnormality. Therefore, in the embodiment, output condition of the abnormality signal is varied according to the operation mode (manual mode, automatic mode, and fully automatic mode) of the printer-processor 10 on which the negative carrier 18 is mounted.

Table 1 shows whether or not the abnormality signal should be output according to the respective abnormality contents, or causes, in each control mode. A mark ○ in the control mode column refers to presence of output of the abnormality signal while a mark X refers to absence of output of the abnormality signal.

TABLE 1

| Code | Abbr. | Results of Detection | Alarm Level A | B | C | Contents |
|---|---|---|---|---|---|---|
| 0 | OK | NORMAL | | | | Frame is normally detected. |
| 1 | SU | UNDEREXPOSURE | ○ | X | X | Frame has undetectable right and left edges. |
| 2 | SO | OVEREXPOSURE | ○ | X | X | Frames have an undetectable edge due to bleeding. |
| 3 | FI | FAULTY INTERVAL | ○ | X | X | Interval between frames is irregular. |
| 4 | FL | FRAME SIZE ABNORMALITY | ○ | X | X | Frame has an irregular frame size. |
| 5 | | FRAME OVERLAP | ○ | X | X | Frames have an overlap region not more than 5 mm. |
| 6 | KB | PARTIAL FOG | ○ | X | X | Frame has a fog at back end thereof. |
| 7 | SN | PARTIALLY UNEXPOSED NEGA | ○ | X | X | Frame is partially unexposed. |
| 8 | F/H | NEGA SIZE ABNORMALITY | ○ | ○ | ○ | Mask is not identical with image in size. |
| 9 | TOP | LEADING EDGE ABNORMALITY | ○ | X | X | Top frame is undetectable. |
| 10 | SNN | UNEXPOSED NEGA | ○ | X | ○ | Entire negative film is unexposed. |
| 11 | KBR | FOGGY NEGA | ○ | X | ○ | Entire negative film is foggy. |
| 12 | NEE | NEGA END ABNORMALITY | ○ | ○ | ○ | Negative film is carried with jammed, meandered or the like. |

TABLE 1-continued

| Code | Abbr. | Results of Detection | Alarm Level | | | Contents |
|------|-------|---------------------|---|---|---|----------|
| | | | A | B | C | |
| 13 | | | | | | |
| 14 | | | | | | |
| 15 | | OTHER ABNORMALITES | ○ | X | ○ | Frame can not be accurately positioned by the other causes. |

A...Automatic Control, B...Fully Automatic Control, C...Manual Control

ROM 290 has a stored program to, for example, compensate a mounting position of each sensor and compensate a deviation of a value detected by each sensor. The program is set as a correction coefficient before shipment of the negative carrier 18. To compensate the mounting position, a distance between the reference side of the printing opening 206 and each sensor is measured by the pulse number of the pulse motor 218, and an error between the measured pulse number and the preset pulse number is corrected. A correction coefficient is set for each image detecting sensor 264 to compensate a deviation of each sensor. Especially, each correction coefficient is set for each sensor 264 such that the four image detecting sensors 264 can detect the same quantity of light from the respective LED chips 258.

Each quantity of light emitted from LED elements and LED chips corresponding to the respective sensors 264, 282, is set to be suitable for the range of each A/D converter 308 for converting analog values detected by the image detecting sensors 264 and the bar code sensors 282 to digital values, before shipment of the negative carrier 18.

RAM 288 has a stored map for setting a transmission density of the negative film on the basis of data detected by the image detecting sensor 264. Therefore, it is possible to obtain a distribution of transmission density in one carrying step by the pulse motor 218 (in the embodiment, the interval between the center of the image frame 16A or 16B and that of the adjacent image frame is defined as one carrying step). The image frame edge is determined based on the distribution of transmission density, and stored corresponding to the feed pulse number of the pulse motor 218.

A description will be given of the operation of the embodiment hereinafter.

First, a normal printing procedure will be described in the following.

When the printing process is started, the light source 38 is turned on and the negative carrier 18 is driven to position the negative film 16. LATD (large area transmittance density) of the negative film 16 is measured by the densitometer 56. The measured data and the manual input data allow to set the exposure correction and calculate an exposure (exposure time). As a result, an optimal print condition can be provided.

Meanwhile, the negative films 16 may have a full-size image frames of a full-size type 16A as well as image frame of a panoramic size type 16B in the same film. Printing processes for the respective size types differ in mask area for negative film, printing magnification, mask area for photographic paper, carrying interval of photographic paper. Therefore, after printing one of both the size types while passing the other, it is efficient to print the other consecutively. Accordingly, in the embodiment, the print condition is set according to the type of the upper mask 240 which has been loaded in the mask base 242. Since the mask base 242 is loaded with the upper mask 240, the type of the upper mask 240 can be discriminated depending on the ON/OFF condition of the limit switch 248. Thus, the printing process is controlled to position only the image frame corresponding to the mask type detected by the limit switch 248, and pass the other type of the image frame.

In the four image detecting sensors 264 of the negative carrier 18, as described above, two of those on the respective longitudinal direction ends are arranged outside the range of longitudinal length of the panoramic size image frame 16B in conjunction with arranged inside the range of longitudinal length of the full-size image frame 16A. Therefore, when the two outermost image detecting sensors 264 detect a base density of the negative film 16, the image frame can be defined as the panoramic size image frame 16B. If an image density is detected, the image frame can be defined as the full-size image frame 16A. For example, if the image detecting sensors 264 detect the panoramic size image frame 16B with full-size upper mask 240 which has been loaded to the mask base 242, this image frame is passed, and the next full-size image frame 16A is positioned at the printing position. Accordingly, it is not necessary to change the conditions so as to a correspond to the respective frame sizes in the course of a continuous printing process so that the printing process efficiency can be improved.

Next, the photographic paper 54 is carried to the exposure chamber 52 to be positioned, thereafter the shutter 50 is opened. The opened shutter 50 allows light emitted from the light source 38 to pass through the filter portion 40 and the negative film 16 to the exposure chamber 52. When the printing process is started to print the image frame of the negative film 16 on the photographic paper 54 positioned in the exposure chamber 52, the respective filters C, M, and Y positioned on the optical axis are moved according to the exposure condition. The shutter 50 is closed after the predetermined exposure time. In the operation set forth hereinbefore, one image frame of the negative film 16 has been completely printed. The above operation is repeated to move the photographic paper 54 so as to carry printed parts thereof to the reservoir portion 70 in order.

The photographic paper 54 carried to the reservoir portion 70 is further carried to the color development portion 74 wherein the photographic paper 54 is immersed in developer for development. The developed photographic paper 54 is carried to a bleach-fix portion 76 for fixing. The fixed photographic paper 54 is carried to the rinse portion 78 to be washed in water. The photographic paper 54 washed in water is carried to the drying portion 80 for a drying process.

In the dried photographic paper 54, a cut mark is detected in the cutter portion 84 so that the photographic paper 54 is cut for each image frame.

In the printer-processor 10, positioning of the image frame can be effected in the manual control mode as well as in the automatic control mode. In addition, in the so-called automatic control mode, the operator monitors the negative carrier 18 at least to operate the print start button. On the other hand, in the so-called fully-automatic control mode, all the operations including the print start step are effected in response to a signal communication between the control unit 220 of the negative carrier 18 and the controller 162 of the printer-processor 10. Thus, the printer-processor 10 is switchable in three control stages (the manual control, the automatic control, and the fully automatic control).

Figure 16:
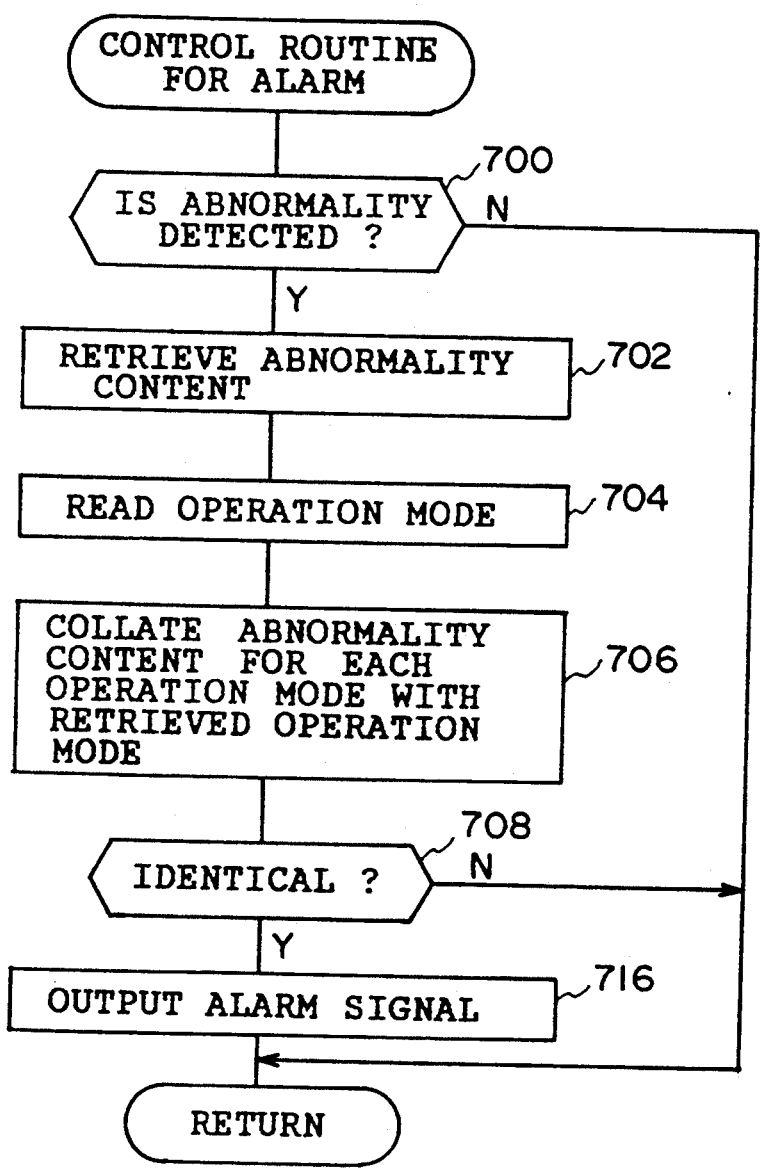
FIG. 16 is a control flowchart of an alarm.

In the embodiment, the output of the abnormality signal from the negative carrier 18 is limited according to each control mode to prohibit an unnecessary alarm provided in spite of the monitoring operator. Referring now to FIG. 16, an alarm control routine will be described hereinafter.

In Step 700, whether or not the abnormality is detected is determined. If the abnormality is detected, the operation proceeds to Step 702 where the abnormality content (cause) is retrieved. Conversely, if the abnormality is not detected, the operation proceeds to return.

Next, in Step 704, the current control mode of the negative carrier 18 is read, thereafter, the abnormality content corresponding to the current control mode is collated with the retrieved abnormality content in Step 706 (see Table 1). In Step 708, if both the abnormality contents are identical with each other, it is determined that an alarm signal is required in the current control mode. The operation proceeds to Step 710 to output the alarm signal, and proceeds to return. Thus, the operation of the printer-processor 10 stops in response to the alarm signal. If both the abnormality contents are not identical with each other in Step 708, the operation proceeds to return.

Namely, as shown in Table 1, in the manual control mode, the abnormality signal is output in the case of Negative Size Abnormality (Code 8), Unexposed Negative Film (Code 10), Foggy Negative Film, (Code 10), Negative Film End Abnormality (Code 12), and Other Abnormalities (Code 15).

In the fully automatic control mode, the abnormality signal is output in only the cases of Negative Size Abnormality (Code 8) and Negative Film End Abnormality (Code 12).

In the automatic control mode, the abnormality signal is output for each abnormality.

In such a way, the abnormality signal is output according to each control mode to prohibit an unnecessary alarm provided in spite of the monitoring operator. Accordingly, the fully automatic control mode can be utilized with advantage.

Further, it is possible to avoid interrupting the operation of the printer-processor per se for each unnecessary abnormality signal, and eliminate action for each abnormality. As a result, the printing operation efficiency can be improved.

In the embodiment, the negative carrier 18 automatically controls to position each image frame 16A (16B) of the negative film 16 at the printing position (in the fully automatic control mode). Each image frame edge is detected by the image detecting sensors 264. The negative carrier 18 controls to carry the image frame edge corresponding to the feed pulse number of the pulse motor 218.

Figure 12:
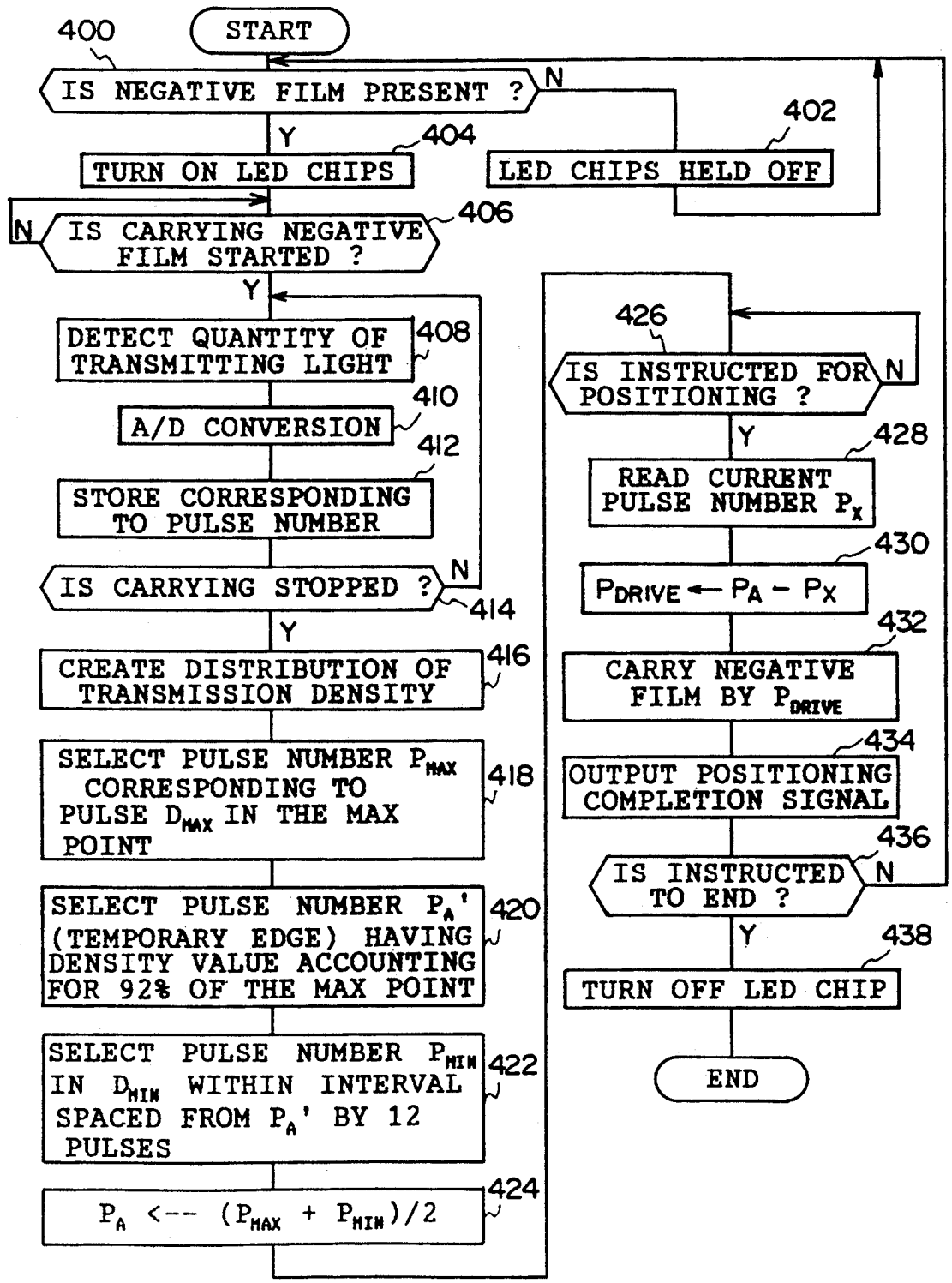
FIG. 12 is a control flowchart of positioning of the image frame.

Referring now to the flowchart of FIG. 12, a positioning procedure of the image frame will be described First, in Step 400, a negative film presence or absence sensor 276 determines whether or not the negative film 16 is inserted into the negative carrier 18. If the negative film 16 is not inserted, the operation proceeds to Step 402 where the LED chips 258 are held off. If the negative film 16 is inserted, the operation proceeds to Step 404 where the LED chips 258 are turned on. Accordingly, since the LED chips are used for light sources, ON-OFF control of the LED chips 258 is very easy and the LED chips life should not be reduced.

Next, if it is determined that carrying the negative film 16 is started to position the negative film 16 at the printing position in Step 406, the operation proceeds to Step 408 to detect quantity of transmitted light which passes through the slit hole 256 to permeate through the negative film 16. Consequently, in Step 410, the quantity of the transmitted light is converted into digital signals in the A/D converter 308. Each converted data is stored corresponding to the feed pulse number (in Step 412).

The Steps 408, 410, and 412 are repeated until, in the next Step 414, it is determined that the negative film 16 is stopped carrying. If, in Step 414, it is determined that the negative film 16 is stopped carrying, the operation proceeds to Step 416 where a distribution of transmission density in one carrying step is created based on the stored data. In Step 418, the maximum point (the maximum density value) is selected in the created distribution of the transmission density to set a feed pulse number $P_{MAX}$ corresponding to the maximum point. In Step 420, a feed pulse number $P_A'$ having a density value accounting for 92% of the maximum point is defined as a temporary edge. In Step 422, the minimum point (the minimum density value) is selected within the interval having a predetermined pulse (12 pulses in the embodiment) measured from the temporary edge $P_A'$. Accordingly, a feed pulse number $P_{MIN}$ corresponding to the minimum point is set. In Step 424, a middlemost position between the feed pulse number $P_{MAX}$ of the maximum point and the feed pulse number $P_{MIN}$ of the minimum point, i.e., $(P_{MAX}+P_{MIN})/2$ is calculated to set a pulse $P_A$ corresponding to the edge of the image frame 16A (16B).

The image frame edge pulse number $P_A$ is determined as described above, and is spaced at a substantially constant interval with respect to the negative film 16 which is underexposed or overexposed as well as the negative film 16 which is normally exposed. Therefore, a detecting error can be reduced in the range for positioning without adverse effects.

In Step 426, it is determined whether or not the controller 262 of the printer-processor 10 has instructed for positioning. If the controller 262 has been directed for positioning. If the controller 262 has been directed the positioning instruction, the operation proceeds to Step 428 to read a current feed pulse number $P_X$. Consequently, in Step 430, a feed amount $P_{DRIVE}$ is calculated based on the current feed pulse number $P_X$ and the image frame edge pulse number $P_A$ (using the expression: $P_{DRIVE}=P_A-P_X$).

In Step 432, the negative film 16 is carried by the calculated feed amount $P_{DRIVE}$. This carrying operation is identified as the carrying in Step 406. Namely, while the negative film 16 is carried, the edge of the image frame 16A (16B) before the preceding image frame is detected upstream the negative film 16.

I Step 434, When the image frame 16A (16B) is positioned at the printing position, a positioning completion signal is output to the controller 162 of the printer-processor 10. In response to the positioning completion signal, the printer-processor 10 performs the printing process as discussed above.

In Step 436, it is determined whether or not the printing process has been instructed to stop. If the printing process has not been instructed to stop, the operation proceeds to Step 400 to continue the process. If the printing process has been instructed to stop, the operation proceeds to Step 438 where the LED chips 258 are turned off to end.

To control the image frame positioning, high-accuracy is essential for the acurate detection of the image detecting sensors 264 and the accurate interval between the mounting positions of the sensors 264 and the printing position. Accordingly, in the embodiment, the accuracy correction of the negative carrier 18 is performed before shipment.

Figure 13:
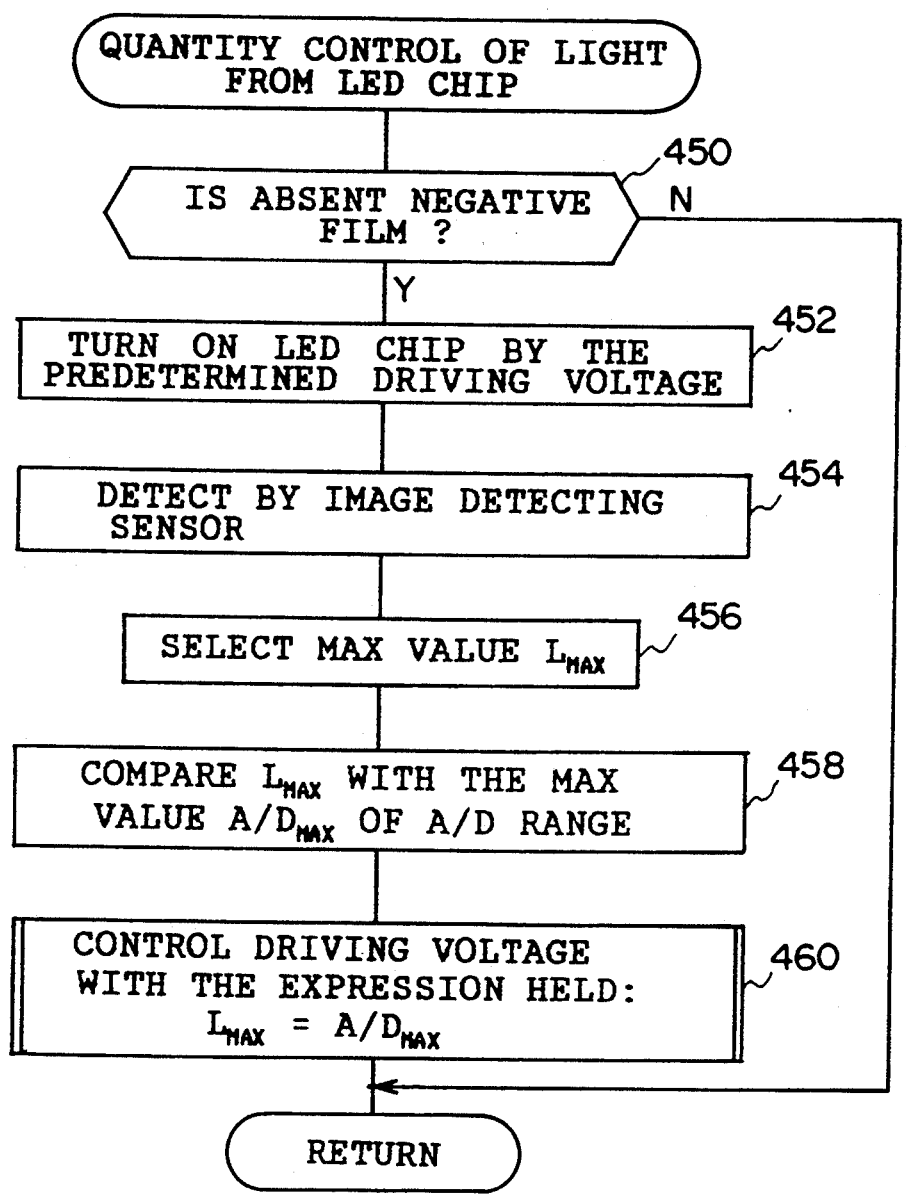
FIG. 13 is a control flowchart of adjustment of quantity of light of LED chip.

Referring now to the flowchart of FIG. 13, a description will be given of the procedure to adjust quantity of light emitted from the LED chips 258. The quantity of light emitted from the LED chips 258 is detected by the image plane sensors 264, and converted into digital data by the A/D converter 308. The A/D converter 308 has a limited range for conversion. Thus, when absence of the negative film 16 is detected in Step 450, the LED chips 258 are turned on in Step 452. The quantity of light is detected by the respective image detecting sensors 264 (in Step 454), and in Step 456, the respective top values in the detected quantity of light are selected to determine the maximum value of the top values.

The selected maximum value $L_{MAX}$ of the quantity of light is compared with the maximum range $A/D_{MAX}$ of the A/D converter 308 (in Step 458). In Step 460, driving voltage applied by LED drivers 300 is controlled such that the maximum value $L_{MAX}$ is given by the expression: $L_{MAX} = A/D_{MAX}$. Therefore, the detected values in the image detecting sensors 264 never depart from a dynamic range of the A/D converter 308, and the A/D converter 308 is ensured to read data. Additionally, since the LED chips 258 are applied to the light source, it is very easy to adjust or control the quantity of light.

Figure 14:
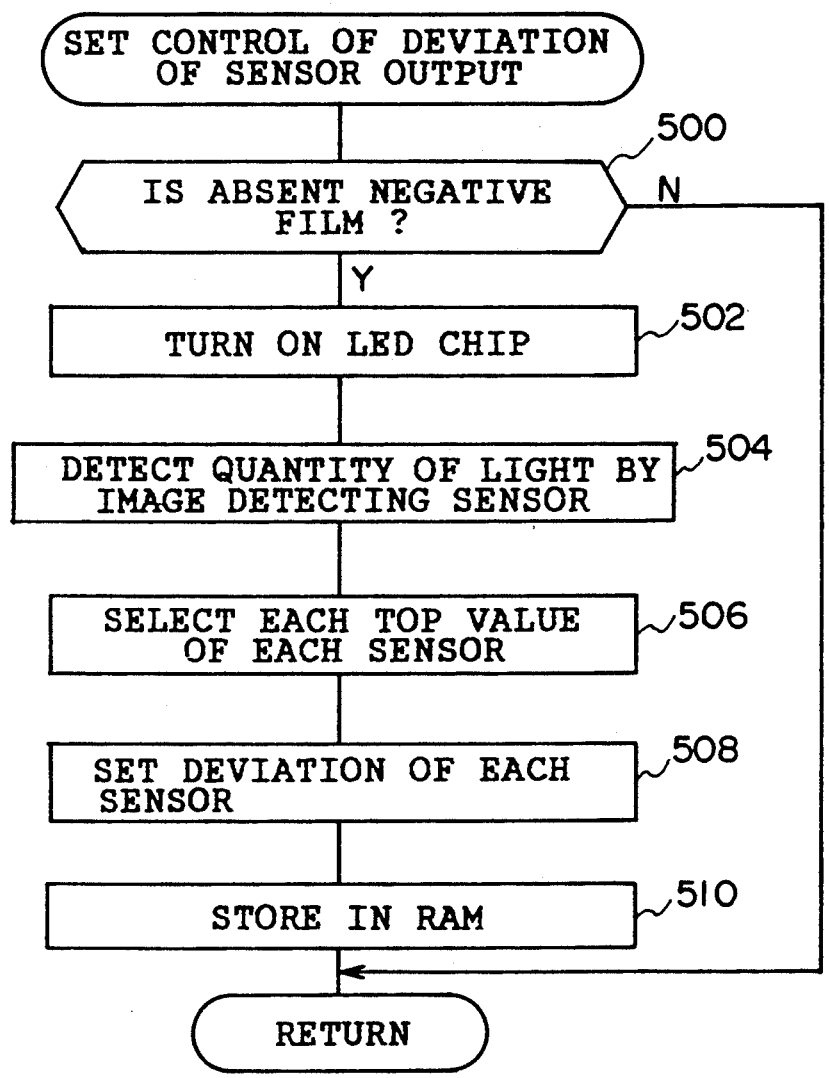
FIG. 14 is a control flowchart of compensation of a deviation of a sensor output.

The four image detecting sensors 264 detect with each slight error (a deviation) due to its detecting accuracy even if detecting the same quantity of light. It is desirable to have the same output from the image detecting sensors 264 when detecting the same quantity of light. Thus, the deviation should be compensated. Referring now to the flowchart of FIG. 14, a description will be given of a set control procedure of a deviation of sensor output.

When absence of the negative film 16 is determined in Step 500, the LED chips 258 are lit up in Step 502. The quantity of light is detected by each image detecting sensor 264 (in Step 504), and in Step 506, the respective top values are selected in the detected values of the respective image detecting sensors 264. Thus far, the control is effected as in the case of the quantity control of light of the LED chips shown in FIG. 13. Therefore, the top values may be stored when the top values have been selected in the quantity control of light of the LED chips in Step 456 shown in FIG. 13.

In Step 508, the top output value of one sensor is defined as a reference value to determine the deviations of the top output values of the remaining three sensors. In Step 510, the deviation is stored as a correction coefficient $\alpha$ of each image detecting sensor 264.

It is assumed that, for example, the image detecting sensors 264 are $S_A$, $S_B$, $S_C$, $S_D$, respectively. If the quantity of light is expressed on the basis of the sensor $S_A$ ($S_A = 1.0$) and the outputs of the remaining sensors are $S_B = 0.9$, $S_C = 0.8$, $S_D = 0.9$, the respective correction coefficients are $\alpha S_A = 1.00$, $\alpha S_B = 1.11$, $\alpha S_C = 1.25$, $\alpha S_D = 1.11$. Namely, the respective correction coefficients $\alpha$ stored in Step 510 are multiplied by data input from each image detecting sensor 264 when the data are input. Accordingly, it is possible to use appropriate values in the A/D conversion and create a high-accurate distribution of transmission density.

Figure 15:
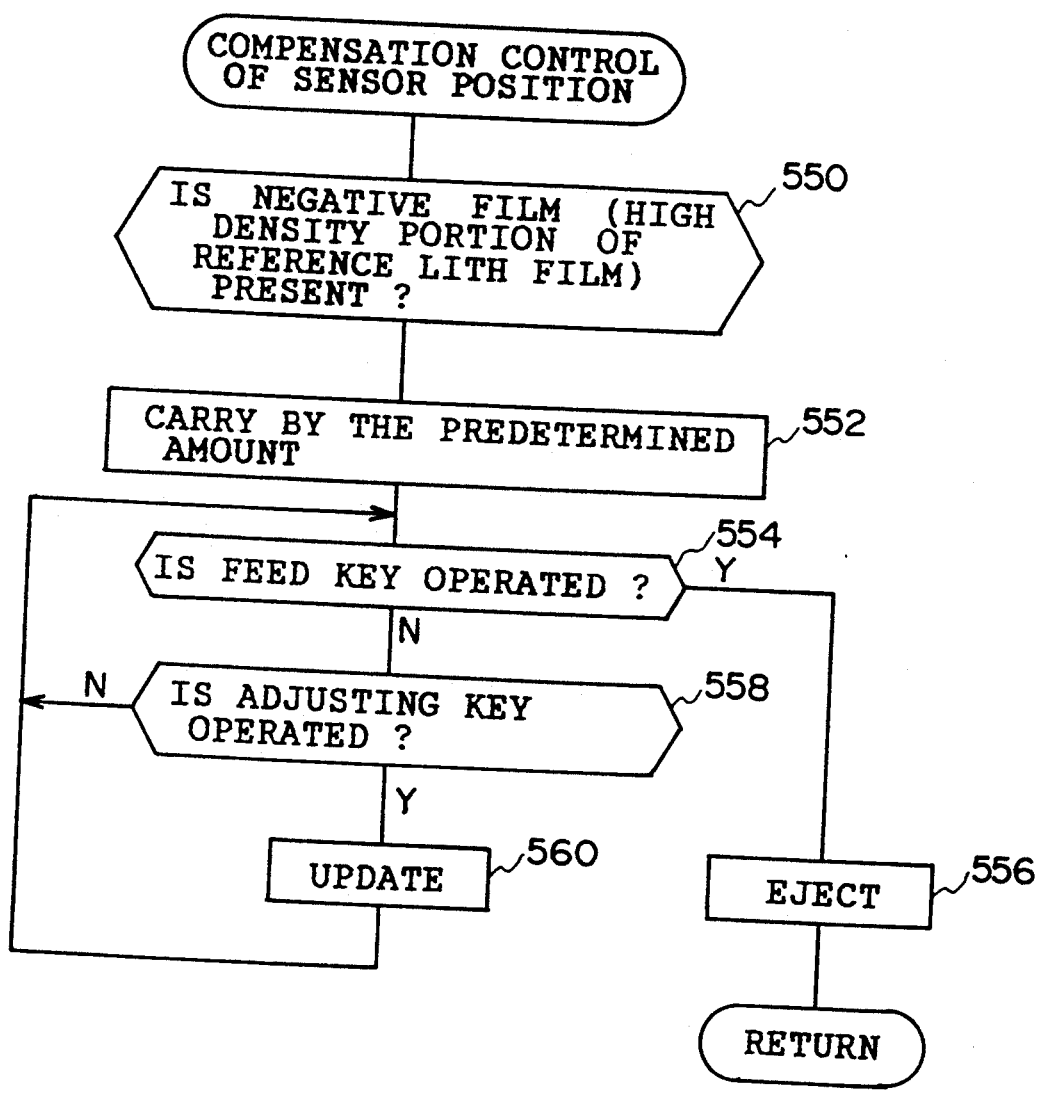
FIG. 15 is a control flowchart of compensation of mounting accuracy of a sensor.

Mounting position of each sensor (the image detecting sensor 264, the bar code sensor 282, the tape sensor 274, the negative film presence or absence sensor 276) is determined on the basis of one side (reference side) of the printing opening 206 at the printing position of the image frame. The respective distances between each sensor and the reference side are defined as the feed pulse number of the pulse motor 218. However, if the respective distances deviate when assembling the negative carrier 18, the respective distances are not identical with the predetermined pulse numbers. Hence, it is necessary to compensate the feed pulse number determined in the design stage, according to the mounting accuracy. Referring now to the flowchart of FIG. 15, a description will be given of the accuracy correction of the sensor mounting.

Though the position correction of each sensor is independently performed, the same process is provided for each sensor. Thus, as an example, the position correction of the negative film presence or absence sensor 276 will be described hereinafter. In Step 550, it is determined whether or not a reference lith film is detected. The reference lith film is a type of a film for photomechanical process, which has a high density (opaque) portion at the intermediate position of a low density (substantially transparent) portion and a clear edge. The reference lith film is substituted for the negative film 16.

The transparent portion is undetectable in the operation. When a boundary between the transparent portion and the high density portion is detected, the operation proceeds from Step 550 to Step 552 to carry the reference lith film by the predetermined amount. The predetermined amount is defined as a carrying amount to position the predetermined detecting point on the right side of the printing opening 206.

In Step 554, the operator detects whether or not the edge between high and low density sides corresponds to the right side of the printing opening after the reference lith film is carried by the predetermined amount. If they correspond with each other, a feed key is operated to eject the reference lith film. Operation of the feed key causes the operation to proceed from Step 554 to Step 556, and eject the reference lith film to end.

If the feed key is not operated, the operation proceeds from Step 554 to Step 558. In Step 558, it is determined whether or not a fine adjustment key are operated to finely adjust. If not, the operation is repeated between Step 554 and Step 558. In Step 558, if the fine adjustment keys 310B, 310C are operated, the reference lith film is slightly moved according to the key operation to position the edge between the high and low density sides on the right side of the printing opening 206.

After the fine adjustment in Step 558 (i.e., after one adjustment step), the operation proceeds to Step 560 to update the predetermined amount after the adjustment. The operation proceeds to Step 554.

The process as described hereinbefore is repeatedly operated until the edge between the high and low density sides is surely positioned on the right side of the printing opening 206 by carrying the reference lith film by the predetermined amount in Step 552. Thus, accuracy of the mounting position is completely compensated.

In other sensors, the operation can be performed as in the case of the operation procedure as described above simply by selecting which sensor is used to detect in Step 550. Therefore, the feeding amount can be stored for the accurate position in spite of errors when assembling the sensors. Thus, it is possible to facilitate a simple mounting operation, and improve the operation efficiency.

Meanwhile, if the four image detecting sensors 264 are not in parallel with the image frame edge, the image frame edge may be shifted to a considerable extent. However, if the above compensation is performed, the four image detecting sensors 264 are apparently disposed in parallel with the image frame edge. As a result, it is ensured to detect the image frame edge.

What is claimed is:

1. A method of controlling an output condition of an abnormality signal in a photographic film carrier for controlling said output condition of said abnormality signal output when an abnormality is detected, said photographic film carrier carrying a photographic film on which image frames are consecutively recorded and positioning each image frame at a printing position in order, said method comprising the steps of:
    (a) determining depending upon the cause of the abnormality under a condition which is set in advance whether or not said abnormality signal should be output, in case that the abnormality that said image frame can not be accurately positioned is detected; and
    (b) outputting said abnormality signal only when determined to output in the step (a).

2. A method of controlling an output condition of an abnormality signal in a photographic film carrier according to claim 1, wherein said condition in said step (a) is set according to an operation mode of a photoprinter provided with said photographic film carrier.

3. A method of controlling an output condition of an abnormality signal in a photographic film carrier according to claim 2, wherein said operation mode is any one of a fully automatic mode in which all the process including a printing process are automatically performed, an automatic mode in which an operator starts said printing process, and a manual mode in which the operator positions said each image frame at said printing position and starts said printing process.

4. A method of controlling an output condition of an abnormality signal in a photographic film carrier according to claim 3, wherein the cause of the abnormality is any one of underexposure, overexposure, faulty interval, frame size abnormality, overlapped frames, partial fog frame, partially unexposed frame, negative film size abnormality, leading edge abnormality, unexposed negative film, foggy negative film, negative film end abnormality, and other cause of the abnormality by which said image frame can not be accurately positioned.

5. A method of controlling an output condition of an abnormality signal in a photographic film carrier according to claim 4, wherein said abnormality signal is output in response to each abnormality cause as enumerated in said claim 4 when said automatic mode is selected as said operation mode.

6. A method of controlling an output condition of an abnormality signal in a photographic film carrier according to claim 1, further comprising the step (c) of alerting the operator to said abnormality in response to output of said abnormality signal.

7. An apparatus of controlling an output condition of an abnormality signal in a photographic film carrier for controlling the output condition of the abnormality signal output when an abnormality is detected, said photographic film carrier carrying the photographic film on which image frames are consecutively recorded and positioning each image frame at a printing position in order, said apparatus comprising:
    detecting means for detecting the abnormality that said image frame can not be accurately positioned;
    determining means for determining depending upon the cause of said detected abnormality under a condition which is set in advance whether or not said abnormality signal should be output; and
    output means for outputting said abnormality signal when it is determined by said determining means that said abnormality signal should be output.

8. An apparatus of controlling an output condition of an abnormality signal in a photographic film carrier according to claim 7, wherein said condition can be set corresponding to one of a plurality of operation modes of a photoprinter provided with said photographic film carrier, said determining means being constituted so as to determined whether or not said abnormality signal should be output according to the operation mode which is currently set in said photoprinter.

9. An apparatus of controlling an output condition of an abnormality signal in a photographic film carrier according to claim 8, wherein said plurality of operation modes comprise a fully automatic mode in which all the process including a printing process are automatically performed, an automatic mode in which an operator starts said printing process, and a manual mode in which the operator positions said each image frame at said printing position and starts said printing process.

10. An apparatus of controlling an output condition of an abnormality signal in a photographic film carrier according to claim 9, wherein the cause of said abnormality is any one of underexposure, overexposure, faulty interval, frame size abnormality, overlapped frames, partial fog frame, partially unexposed frame, negative film size abnormality, leading edge abnormality, unexposed negative film, foggy negative film, negative film end abnormality, and other causes of the abnormality by which said image frame can not be accurately positioned.

11. An apparatus of controlling an output condition of an abnormality signal in a photographic film carrier according to claim 7, further comprising a storage means having a plurality of causes of abnormality stored in advance, said determining means including a retrieval means for retrieving cause of abnormality corresponding to the cause of said detected abnormality among said plurality of causes of abnormality stored in said storage means and being constituted so as to determine based upon the cause retrieved by said retrieval means under said condition whether or not said abnormality signal should be output.

12. An apparatus of controlling an output condition of an abnormality signal in a photographic film carrier according to claim 7, further comprising an alarm means for alerting to said abnormality in response to output from said output means.

13. A photographic film carrier for carrying a photographic film on which image frames are consecutively recorded and positioning each image frame at a printing position in order, comprising:

a base having a guide path for guiding said photographic film, said guide path being formed with a pass opening for exposing light at said printing position;

image frame detecting means disposed upstream said printing position of the guide path, and detecting said image frame based on a transmission density of said photographic film;

positioning means for positioning said image frame detected by said image frame detecting means at said printing position;

abnormality detecting means for detecting the abnormality that said image frame can not be accurately positioned by said positioning means;

determining means for determining depending upon the cause of the detected abnormality under a condition which is set in advance whether or not an abnormality signal should be output; and output means for outputting said abnormality signal when it is determined by said determining means that said abnormality signal should be output.

14. A photographic film carrier according to claim 13, further comprising a storage means provided with a plurality of causes of the abnormality stored in advance, said determining means having a retrieval means for retrieving a cause of abnormality corresponding to the cause of said detecting abnormality among said plurality of causes of abnormality stored in said storage means and being constituted so as to determined based upon the cause retrieved by said retrieval means under said condition whether or not said abnormality signal should be output.

15. An apparatus of controlling an output condition of an abnormality signal in a photographic film carrier according to claim 13, further comprising an alarm means for alerting an operator to said abnormality in response to output from said output means.

16. A photographic film carrier according to claim 15, wherein an alarm serves as said alarm means.

17. A photographic film carrier according to claim 13, wherein said condition can be set corresponding to one of a plurality of operation modes of a photoprinter having said photographic film carrier, said determining means determining whether or not said abnormality signal should be output according to the operation mode which is currently set in said photoprinter.

18. A photographic film carrier according to claim 17, wherein a plurality of said operation modes comprise a fully automatic mode in which all the process including a printing process are automatically performed, an automatic mode in which an operator starts said printing process, and a manual mode in which the operator positions said each image frame at said printing position and starts said printing process.

19. A photographic film carrier according to claim 13, wherein the cause of said abnormality is any one of underexposure, overexposure, faulty interval, frame size abnormality, overlapped frame, partial log frame, partial unexposed frame, negative film size abnormality, leading edge abnormality, unexposed negative film, foggy negative film, negative film end abnormality, and other causes of the abnormality by which said image frame can not be accurately positioned.

* * * * *